July 27, 1926.
J. C. LEDBETTER
1,594,226
CABLE CONNECTER
Filed Jan. 22, 1924
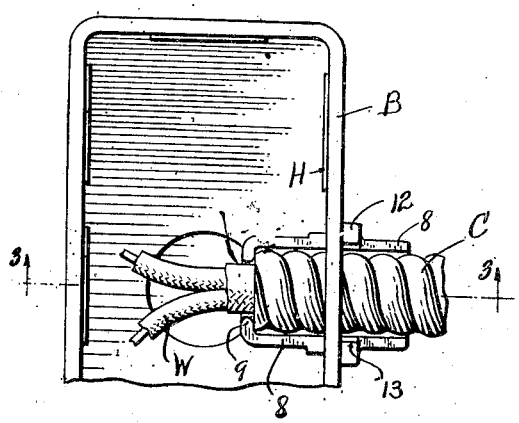
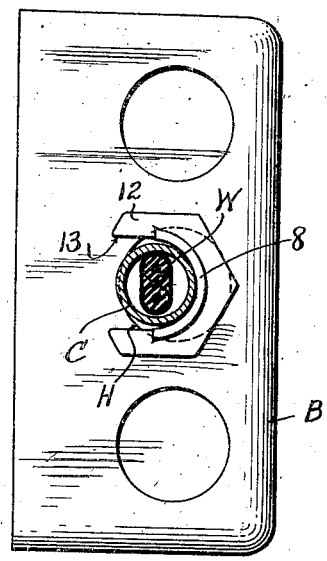
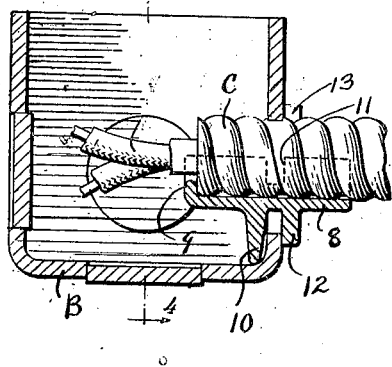
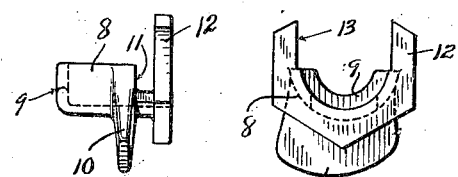
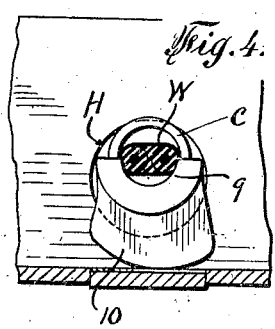
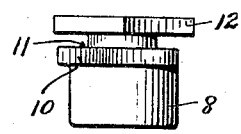
INVENTOR
James C. Ledbetter
BY
ATTORNEYS Patented July 27, 1926.

BEST AVAILABLE COPY 1,594,226

UNITED STATES PATENT OFFICE.

JAMES C. LEDBETTER, OF BROOKLYN, NEW YORK, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,775.

This invention relates to combination cable connecters and outlet boxes, and more particularly to improvements in connecters for use in joining electric cables to outlet box fixtures and the like.

An object of the invention is to produce improved combinations as aforesaid, and particularly to produce an improved cable connecter of simple and preferably one piece structure which is capable of being manufactured at low cost and without machining, finishing, or threading operations, and which positively anchors a cable to standard round knock-out holes in the usual run of electric fixture boxes such as cable and outlet boxes, switch and fuse boxes, and others; and this improved connecter accomplishes the purposes named, without employing screws or other machine made or fitted parts.

A particular object of the invention is to produce a connecter so designed and constructed with its body lines all tapering in one direction that it may be cast or molded in a complete article and not require screws to secure it in a box or to secure a cable in a box.

The accompanying drawing illustrates a preferred form of the invention, the construction of which may be suitably varied or modified to meet the requirements of manufacturer and user without departing from the scope and principle of my invention.

Figure 1 is a plan view of an open electric fixture box showing a cable connected thereto by using my improved cable connecter; and Figure 2 is an end elevation thereof.

Figure 3 shows a sectional view developed on the line 3—3 of the drawing; and Figure 4 shows a sectional view on the line 4—4.

Figure 5 illustrates a cluster view of an improved cable connecter removed from the box and illustrates a side, end, and bottom projection thereof and possessing certain features of improvement not shown in the assembly views.

To those conversant with the art it is understood how electric fixture boxes B are usually manufactured with knock-out holes H, and electric conduit or cable C carrying wires W is secured in the knock-out holes H by means of connecters. Accordingly, it is fitting that the primary object of my invention as aforesaid is to produce improved connecters for this purpose.

With further reference to the connecter structure itself, it is observed that the device comprises a single piece simple casting on which no machine work such as drilling, punching, or tapping is necessary after the casting is completed in the foundry. The casting essentially consists of three body formations, and a particular feature of the invention resides in the simplicity thereof, and its straight line design and structure as compared to connecters now on the market.

The connecter embodies a cable rest or cradle 8 of arcuate form, or a short body structure or shell possessing an open unrestricted rim at one end while it is provided with an arcuate shoulder rest or bushing 9 on the other end, the said shoulder functioning as an abutment against which the cable C rests when in position such as clearly appears in Figures 1 and 3.

A cam 10 is integrally cast on the body shell 8 and projects substantially at right angles thereto and is eccentric to the axis of the body shell 8. The upper part of the cam is arcuate to form a cable seat or simply forms a part of the cradle 8. The said cam is so designed and made on its other end as will cause it to bear against the bottom of the box wall B when placed in position in the box.

An abutment anchorage in the form of a nut or wrench-head 12 is integrally cast on the body shell 8 and is spaced from the cam to form a space into which seats the box hole edge. The part 12 is adapted to receive the jaws of an ordinary wrench for the purpose of rotating the connecter relatively to the box to produce a camming action between the box and the cam. This nut 12 is made open as at 13, being provided with this substantially large gap, preferably U-shaped, for the purpose of permitting the cable to be readily inserted in position in the arcuate shell or cradle piece 8, as well as being designed in this manner to simplify the manufacture thereof. A wrench-head or nut-shaped structure is illustrated, but in some cases I may cast this part round with corrugations or ribs thereon to enable it to be grasped and rotated with pliers or other suitable tool.

The space between the cam and the tool or wrench-head is made just sufficient, preferably, as to enable the box wall B to be inserted therein between, and the deep groove existing between the wrench-head and cam holds the connecter in secure position in the box and prevents it from wobbling therein. The cam as well as the wrench-head functions to seal and close over the open portions of the knock-out hole H in the box when the parts are assembled thus producing a well closed box structure. The shell 8 may be made with a notch or box wall groove 11 cast therein between the cam and wrench-head to provide sufficient clearance between the shell and box edge as will allow easy insertion and removal of the connecter from the box as more fully hereinafter explained. The two notches 11, one on each side of the body 8, are cut or cast deep enough into the body as to permit the connecter to be lifted upwardly in the box hole H, but at the same time sufficient connecting stock in the form of a neck between the two notches integrally joins the tool-head and cam holding them in parallel spaced relation.

The connecter is first inserted, preferably from the outside of the box, with the box wall opening edge brought into registry with the deep channel groove between the wrench-head and cam, and with the cam moved away from the bottom of the box; and in this position the end of the cable C may be readily thrust through the box hole and supported by the cradle 8 with the end of the cable abutting against the shoulder 9. A wrench or other tool is now applied to the part 12 and the connecter is forcibly rotated until the cam works against the box wall and drives upwardly on the connecter causing the cable to be pinched into the box wall knock-out edge. Thus the cable is pressed tightly along the inner surface of the connecter support as well as pinched into the sharp edge of the box opening with the result that the connecter positively fastens itself to the box, as well as fastening the cable to the box.

Figure 5 illustrates the connecter as designed with a relatively short cradle body with the tool-head formed on the end thereof which economizes in metal and provides a still less expensive and light weight construction. The notch 11 is also shown in this simple form because it is essential where the cradle is substantially half-round.

The connecter is inexpensive to manufacture, and as aforesaid, it involves no expensive machine work in finally preparing it for use, for it is observed that the trough-like shape of the cable rest 8 is a part capable of being easily manufactured, and possibly more so than sleeve type connecters; and likewise since the two flat parts or projections 10 and 12 are parallel and project rightangularly from the body 8—15, it follows that very low cost production exists in producing the parts in the foundry because the design of the entire structure is so laid out that the pattern readily withdraws from the sand in the molding and casting operations.

What I claim is:

1. Cable and box connecting means comprising, a box provided with a hole, a cradle member of such size as will fit into said hole, said cradle being provided with spaced means abutting the opposite box wall surface adjacent the hole to anchor the cradle in the box against longitudinal displacement, said cradle being formed to expose a portion of the box hole edge directly to a cable disposed therein, and said cable and box connecting means also including means cooperating with said cradle to grip a cable between the cradle and exposed box hole edge.

2. Cable and box connecting means comprising, a box provided with a hole, a cradle member of such size as will fit into said hole, said cradle being provided with spaced means abutting the opposite box wall surfaces adjacent the hole to anchor the cradle in the box against longitudinal displacement and formed to expose a portion of the box hole edge directly to a cable placed therein, a tool receiving means on the cradle and provided with a cable opening therethrough, and said cable and box connecting means also including means operated by said tool receiving means to move the cradle laterally in the box hole to grip a cable between the cradle and exposed box hole edge.

3. A cable connecter comprising a cradle-like part to receive a cable, a cam thereon, a tool receiving means on the cradle-like part spaced from the cam by which the connecter is turned to rotate the cam, said tool receiving means having an opening to receive a cable, and said connecter being provided with a box hole edge receiving means between the tool receiving means and cam.

4. A cable connecter comprising an arcuate body in the form of a cradle to support a cable without enclosing it, said body including a cam at right angles thereto, a tool receiving means with a cable opening by which the connecter is turned to rotate the cam, and said connecter being provided with a box hole edge groove into which seats a box wall.

5. A cable connecter comprising an arcuate body in the form of an open cradle support to receive cable, a cam thereon, a nut integral with the cradle and spaced from the cam by which the connecter and cam are turned, a box wall groove made between the nut and cam, and said nut being made with a U-shaped opening which opens above and in line with the open cradle.

6. A connecter comprising a cam and nut integrally formed but spaced apart to provide a box hole edge receiving groove, and a cable rest in the form of an arcuate cradle integrally joining together the cam and toolhead by which the cam is turned.

7. A cable connecter comprising, a member embodying a cam edge on one end and an arcuate cable seat made on the other end thereof, a nut disposed parallel and in spaced relation from the member to provide a box hole edge groove in the connecter, an integral part joining together the member and the nut, and said nut being provided with an upwardly directed U-shaped opening extending above the arcuate cable seat.

8. A cable connecter comprising, a nut which is larger than a box hole, said nut made with a U-shaped cable seat in which a cable is adapted to rest and left exposed to a box hole edge, a cam small enough to pass through a box hole disposed in parallel spaced relation from the nut, said cam also including a substantially U-shaped cable seat conforming to the first cable seat named, and a connecting neck integrally joining the cam and nut.

In testimony whereof I affix my signature.

JAMES C. LEDBETTER.